US012081917B2

(12) United States Patent
Shields (10) Patent No.: US 12,081,917 B2
(45) Date of Patent: Sep. 3, 2024

(54) PROJECTION SYSTEM AND METHOD FOR UNIFORMITY CORRECTION (71) Applicant: Dolby Laboratories Licensing Corporation, San Francisco, CA (US)

(72) Inventor: Jerome D. Shields, Lumberton, NJ (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/796,423

(22) PCT Filed: Jan. 28, 2021

(86) PCT No.: PCT/US2021/015554
§ 371 (c)(1),
(2) Date: Jul. 29, 2022

(87) PCT Pub. No.: WO2021/155044
PCT Pub. Date: Aug. 5, 2021

(65) Prior Publication Data
US 2023/0344970 A1 Oct. 26, 2023

Related U.S. Application Data (60) Provisional application No. 62/967,655, filed on Jan. 30, 2020, provisional application No. 63/125,202, filed on Dec. 14, 2020.

(51) Int. Cl.
*H04N 9/31* (2006.01)
*G03B 21/00* (2006.01)
(Continued)

(52) U.S. Cl.
CPC .......... *H04N 9/3182* (2013.01); *G03B 21/008* (2013.01); *G06V 10/141* (2022.01);
(Continued)

(58) Field of Classification Search
CPC .......... H04N 9/3182; H04N 5/52; H04N 5/74; H04N 9/3194; G03B 21/008;
(Continued)

(56) References Cited

U.S. PATENT DOCUMENTS 6,061,102 A 5/2000 Sheppard
6,611,380 B2 8/2003 Kowarz
(Continued)

FOREIGN PATENT DOCUMENTS

CN 105357505 A 2/2016
CN 108572495 A * 9/2018 .......... G03B 21/147
(Continued)

OTHER PUBLICATIONS

Zhong Zhou, Tao Yu, Xiaofeng Qiu, Ruigang Yang, and Qinping Zhao, Light Field Projection for Lighting Reproduction, Mar. 2015 , In 2015 IEEE Virtual Reality (VR), pp. 135-142. (Year: 2015).*

(Continued)

Primary Examiner — Jeffery A Brier (57) ABSTRACT

A projection system and calibration method therefore relate to a light source configured to emit a light in response to an image data, an optical system configured to project the light emitted by the light source; receiving an input associated with a plurality of light values corresponding to a plurality of primary lightfields; converting the input associated with the plurality of light values to a plurality of projector primary color values; determining a gain map based on the plurality Values of projector primary color values; applying the gain map to an image to perform a chromaticity uniformity correction by adjusting levels of the plurality of primary lightfields so that a primary mixture is the same over an image frame, and projecting the image with the optical system in the image frame, wherein the second image is corrected by the gain map.

20 Claims, 6 Drawing Sheets (51) Int. Cl.
*G06V 10/141* (2022.01)
*G06V 10/56* (2022.01)
*G06V 10/60* (2022.01)
*H04N 5/52* (2006.01)
*H04N 5/74* (2006.01)

(52) U.S. Cl.
CPC .............. *G06V 10/56* (2022.01); *G06V 10/60* (2022.01); *H04N 5/52* (2013.01); *H04N 5/74* (2013.01)

(58) Field of Classification Search
CPC .. G03B 21/2046; G06V 10/141; G06V 10/56; G06V 10/60
See application file for complete search history.

(56) References Cited

U.S. PATENT DOCUMENTS

| | | | |
|---|---|---|---|
| 8,098,265 B2 | 1/2012 | El-Ghoroury | |
| 8,384,620 B2 | 2/2013 | Brown | |
| 8,401,289 B2 | 3/2013 | Edge | |
| 8,711,085 B2 | 4/2014 | Ward | |
| 9,773,471 B2 | 9/2017 | Demos | |
| 9,843,790 B2 | 12/2017 | Lucente | |
| 10,002,587 B2 | 6/2018 | Mizushiro | |
| 10,089,960 B2 | 10/2018 | Greenebaum | |
| 10,191,362 B2 | 1/2019 | Okamoto | |
| 10,194,122 B2 | 1/2019 | Tang | |
| 10,490,159 B2 | 11/2019 | Okamoto | |
| 2005/0001991 A1 | 1/2005 | Ulichney | |
| 2007/0115440 A1 | 5/2007 | Wiklof | |
| 2011/0129165 A1* | 6/2011 | Lim | H04N 23/951 382/255 |
| 2015/0130827 A1 | 5/2015 | Mizushiro | |
| 2016/0112690 A1* | 4/2016 | Yang | G03B 21/204 345/690 |
| 2019/0098270 A1* | 3/2019 | Grundhöfer | H04N 13/327 |
| 2019/0104301 A1 | 4/2019 | Richards | |
| 2020/0225481 A1* | 7/2020 | Bodiya | G09G 5/10 |
| 2021/0176437 A1* | 6/2021 | Liu | H05B 45/20 |

FOREIGN PATENT DOCUMENTS

| | | |
|---|---|---|
| EP | 3364651 B1 | 3/2020 |
| EP | 3771204 A1 | 1/2021 |
| JP | 2015037204 A | 2/2015 |
| RU | 2667034 C2 | 9/2018 |

OTHER PUBLICATIONS

Williams, L. et al "Pixel-Wise Inter/Intra-Channel Color & Luminance Uniformity Corrections for Multi-Channel Projection Displays" presented at the Image 2016 Conference, Dayton, Ohio—Jun. 28-29, 2016.

* cited by examiner

PROJECTION SYSTEM AND METHOD FOR UNIFORMITY CORRECTION

CROSS REFERENCE TO RELATED APPLICATIONS

This application claims priority to U.S. Provisional Application Nos. 61/967,655 and 63/125,202, filed Jan. 30, 2020 and Dec. 14, 2020, respectively, each of which is incorporated by reference in its entirety.

BACKGROUND

1. Field of the Disclosure

This application relates generally to projection systems and methods of correcting uniformity errors in an image frame.

2. Description of Related Art

Digital projection systems typically utilize a light source and an optical system to project an image onto a surface or screen. The light source, acting as a color display, mixes primary colors to make other colors. To display or project a particular color, a precise mixture is required and must be repeated over the entire image frame. When displaying a pure white image, for example, the light source maximizes the red, green, and blue values at each point on the surface or screen. However, when the precise mixture is not the same over the entire image frame, the image has a uniformity error. Uniformity errors may be caused by physical characteristics of the digital projection system (e.g., manufacturing tolerances, wear and tear on projector components, thermal effects, bent cables, and the like). The image uniformity errors can be categorized into chromaticity uniformity errors and luminance uniformity errors. For example, chromaticity tinting may occur along the edges of the projected image (a chromaticity uniformity error), or some sections of the projected image may appear brighter than others (a luminance uniformity error).

BRIEF SUMMARY OF THE DISCLOSURE

Various aspects of the present disclosure relate to devices, systems, and methods for uniformity correction of a displayed image.

In one exemplary aspect of the present disclosure, there is provided a projection system comprising a light source configured to emit a light in response to an image data; an optical system configured to project the light emitted by the light source, and a controller configured to: receive an input associated with a plurality of light values corresponding to a plurality of primary lightfields, convert the input associated with the plurality of light values to a plurality of projector primary color values, determine a gain map based on the plurality of projector primary color values, apply the gain map to an image to perform a chromaticity uniformity correction by adjusting levels of the plurality of primary lightfields so that a primary mixture is the same over an image frame, and project the image with the optical system in the image frame, wherein the second image is corrected by the gain map.

In another exemplary aspect of the present disclosure, there is provided a method of correcting an image provided by a light source configured to emit a light in response to image data and an optical system configured to project the light emitted by the light source, the method comprising: receiving an input associated with a plurality of light values corresponding to a plurality of primary lightfields, converting the input associated with the plurality of light values to a plurality of projector primary color values, determining a gain map based on the plurality of projector primary color values, applying the gain map to an image to perform a chromaticity uniformity correction by adjusting levels of the plurality of primary lightfields so that a primary mixture is the same over an image frame, and projecting the image with the optical system in the image frame, wherein the second image is corrected by the gain map.

In another exemplary aspect of the present disclosure, there is provided a non-transitory computer-readable medium storing instructions that, when executed by a processor of a projection system including a light source configured to emit a light in response to an image data and an optical system configured to project the light emitted by the light source, cause the projection device to perform operations comprising receiving an input associated with a plurality of light values corresponding to a plurality of primary lightfields, converting the input associated with the plurality of light values to a plurality of projector primary color values, determining a gain map based on the plurality of projector primary color values, applying the gain map to an image to perform a chromaticity uniformity correction by adjusting levels of the plurality of primary lightfields so that a primary mixture is the same over an image frame, and projecting the image with the optical system in the image frame, wherein the second image is corrected by the gain map.

In this manner, various aspects of the present disclosure provide for the display of images having a high dynamic range and high resolution, and effect improvements in at least the technical fields of image projection, holography, signal processing, and the like.

DESCRIPTION OF THE DRAWINGS

These and other more detailed and specific features of various embodiments are more fully disclosed in the following description, reference being had to the accompanying drawings, in which.

DETAILED DESCRIPTION

This disclosure and aspects thereof can be embodied in various forms, including hardware, devices, or circuits controlled by computer-implemented methods, computer program products, computer systems and networks, user interfaces, and application programming interfaces; as well as hardware-implemented methods, signal processing circuits, memory arrays, application specific integrated circuits (ASICs), field programmable gate arrays (FPGAs), and the like. The foregoing summary is intended solely to give a general idea of various aspects of the present disclosure, and does not limit the scope of the disclosure in any way.

In the following description, numerous details are set forth, such as optical device configurations, timings, operations, and the like, in order to provide an understanding of one or more aspects of the present disclosure. It will be readily apparent to one skilled in the art that these specific details are merely exemplary and not intended to limit the scope of this application.

Moreover, while the present disclosure focuses mainly on examples in which the various circuits are used in digital projection systems, it will be understood that this is merely one example of an implementation. It will further be understood that the disclosed systems and methods can be used in any device in which there is a need to project light; for example, cinema, consumer, and other commercial projection systems, heads-up displays, virtual reality displays, and the like. Disclosed systems and methods may be implemented in additional display devices, such as with an OLED display, an LCD display, a quantum dot display, or the like.

Chromaticity and Luminance Uniformity

As previously described, image uniformity can be categorized into chromaticity uniformity and luminance uniformity. Chromaticity uniformity is a measure of the variation of chromaticity over the image frame (i.e., the full frame of pixels that create an image) without consideration of the absolute chromaticity of the desired color. Chromaticity uniformity may be measured by comparing the chromaticity of the image to that of the desired color.

Luminance uniformity is a measure of how well the luminance over the image frame conforms to a prescribed luminance profile. While the luminance profile may not be flat, a uniform luminance may be smooth and symmetrical about the center of the image, albeit brighter in the center. Luminance uniformity may not consider the absolute luminance of the desired color, but rather the luminance profile. The luminance uniformity may be measured by comparing the luminance of the image to that of the desired color. If the luminance profile is not flat, the luminance should match at the image center.

Variations in luminance uniformity and chromaticity uniformity may not be equally perceived by the eyes of a viewer of the projected image. Luminance uniformity errors may be very large without being visibly objectionable, and may in some cases be ignored. Chromaticity uniformity errors, however, are easily noticed. For example, for a white flat-field image, if the chromaticity is uniform and the luminance smoothly deviates from the luminance profile by between 10% and 20%, the probability of an observer noticing the luminance error is low. However, if chromaticity has each of the color primaries varying from each other by between 10% and 20%, the chromaticity error is more easily noticeable.

These deviations in chromaticity and luminance across the image frame occur due to the projector having physical components with non-ideal behavior, which may be caused by manufacturing tolerances, wear and tear on projector components, thermal effects, bent cables, and the like. For example, when a flat white image is applied as input with no uniformity correction, the screen shows raw primary lightfields. To display flat white images, the primary lightfields may be fully driven at their maximum power. Accordingly, uniformity correction of a white image involves reducing light in areas of the primary lightfields. A high peak level of the primary lightfields is desirable, so uniformity correction should minimize any reduction in luminance.

Chromaticity uniformity correction adjusts the levels of the primary lightfields themselves, such that the primary mixture of the primary lightfields is the same over the entire image frame. For example, when the primary lightfields are red, green, and blue (i.e., an RGB primary), white is displayed as (R, G, B)=(1, 1, 1), where 1 is a maximum value for each lightfield. The primary lightfields should be adjusted so that each point on the image frame is reduced to the minimum value of the three primary lightfields, resulting in chromaticity uniformity with minimum total light loss. Performing this operation on a white screen may correct uniformity error in all flat-field images other than white for the projection system. However, in a situation where a primary lightfield has such a low level that the chromaticity correction causes an unacceptably low light output, the display may be considered defective.

If a chromaticity uniformity correction is already applied, a luminance uniformity correction adjusts all primary lightfields by the same amounts, as each primary lightfield has the same level map or shape. However, this shape may not match the prescribed luminance profile, and attempting to match the prescribed luminance profile involves reducing the light level of each of the primary lightfields. Accordingly, luminance uniformity may only be applied if the non-uniformity is visible to an observer, or the display must conform to a standard specification for uniformity.

Chromaticity correction benefits from a target luminance profile at which all primary lightfields conform. If any one or the raw primary lightfields is not smooth, a target luminance profile that is the minimum of the three lightfields may also not be smooth. A chromaticity uniformity correction targeting a non-smooth luminance profile would create a luminance non-uniformity that may be visible. To prevent this, a smooth lower-bound of the minimum of the primary lightfields is used as the target luminance profile. If a luminance uniformity correction is included in the target luminance profile, the same smoothing constraint may be used. The various correction operations described herein may be implemented by the projector as will be described in more detail below.

Projector Systems

Figure 1:
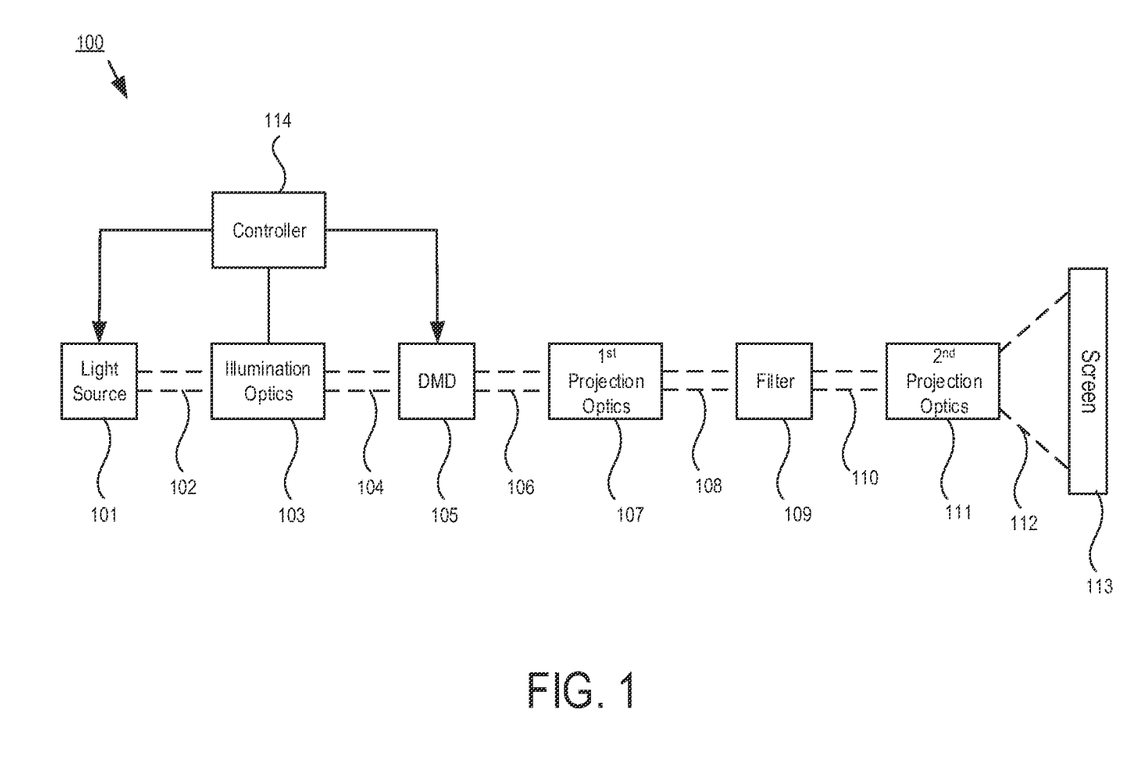
FIG. 1 illustrates a block diagram of an exemplary projection system according to various aspects of the present disclosure.

FIG. 1 illustrates an exemplary high contrast projection system 100 according to various aspects of the present disclosure. In particular, FIG. 1 illustrates a projection system 100 which includes a light source 101 configured to emit a first light 102; illumination optics 103 (one example of an illumination optical system in accordance with the present disclosure) configured to receive the first light 102 and redirect, steer or otherwise modify it, thereby to generate a second light 104 (i.e., a steered light); a DMD 105 configured to receive the second light 104 and selectively redirect and/or modulate it as a third light 106 (i.e., a modulated light); first projection optics 107 configured to receive the third light 106 and project it as a fourth light 108; a filter 109 configured to filter the fourth light 108, thereby to generate a fifth light 110; and second projection optics 111 configured to receive the fifth light 110 and project it as a sixth light 112 onto a screen 113.

In practical implementations, the projection system 100 may include fewer optical components or may include additional optical components such as mirrors, lenses, waveguides, optical fibers, beam splitters, diffusers, and the like. With the exception of the screen 113, the components illustrated in FIG. 1 may, in one implementation, be integrated into a housing to provide a projection device. In other implementations, the projection system 100 may include multiple housings. For example, the light source 101, the illumination optics 103, and the DMD 105 may be provided in a first housing, and the first projection optics 107, the filter 109, and the second projection optics 111 may be provided in a second housing which may be mated with the first housing. In some further implementations, one or more of the housings may themselves include subassemblies. The one or more housings of such a projection device may include additional components such as a memory, input/ output ports, communication circuitry, a power supply, and the like.

The light source 101 may be, for example, a laser light source, an LED, and the like. Generally, the light source 101 is any light emitter which emits light. In some implementations, the light is coherent light. In some aspects of the present disclosure, the light source 101 may comprise multiple individual light emitters, each corresponding to a different wavelength or wavelength band. The light source 101 emits light in response to an image signal provided by the controller 114; for example, one or more processors such as a central processing unit (CPU) of the projection system 100. The image signal includes image data corresponding to a plurality of frames to be successively displayed. Individual elements in the projection system 100, including the DMD 105, may be controlled by the controller 114. While not particularly illustrated in FIG. 1, the controller 114 may additionally or alternatively control the illumination optics 103, the first projection optics 107, and the second projection optics 111. The image signal may originate from an external source in a streaming or cloud-based manner, may originate from an internal memory of the projection system 100 such as a hard disk, may originate from a removable medium that is operatively connected to the projection system 100, or combinations thereof.

Although FIG. 1 illustrates a generally linear optical path, in practice the optical path is generally more complex. For example, in the projection system 100, the second light 104 from the illumination optics 103 is steered to the DMD chip 105 (or chips) at an oblique angle.

Figure 2A:
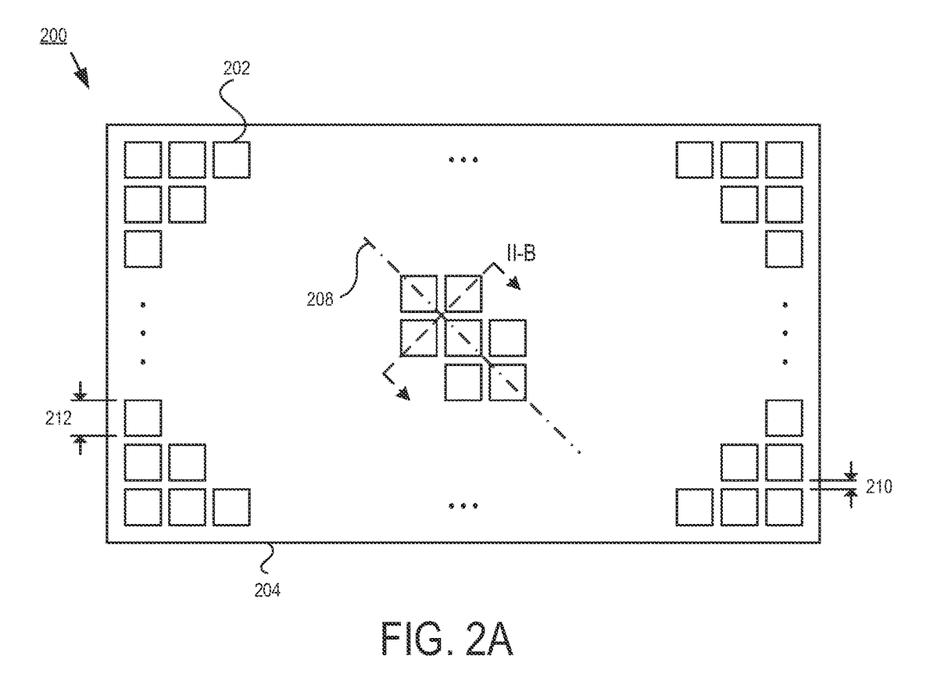
FIGS. 2A-2B illustrate views of an exemplary spatial light modulator for use with various aspects of the present disclosure.
Figure 2B:
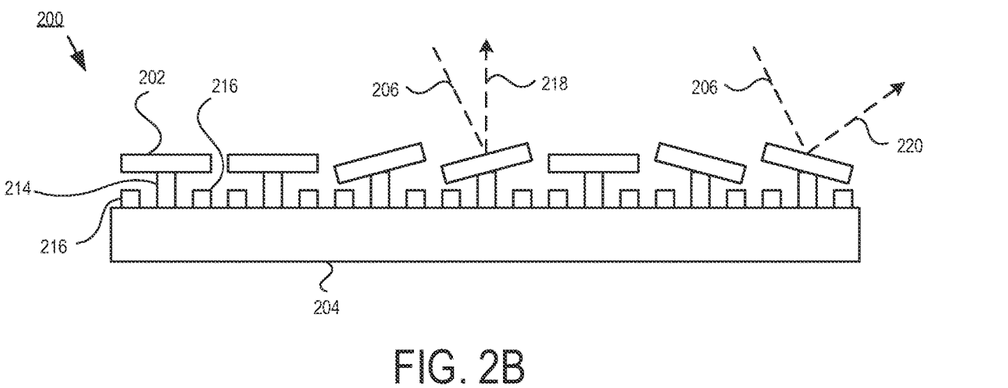

To illustrate the effects of the angle of incidence and the DMD mirrors, FIGS. 2A-2B show an exemplary DMD 200 in accordance with various aspects of the present disclosure. In particular, FIG. 2A illustrates a plan view of the DMD 200, and FIG. 2B illustrates partial cross-sectional view of the DMD 200 taken along line II-B illustrated in FIG. 2A. The DMD 200 includes a plurality of square micromirrors 202 arranged in a two-dimensional rectangular array on a substrate 204. In some examples, the DMD 200 may be a digital light processor (DLP) from Texas Instruments. Each micromirror 202 may correspond to one pixel of the eventual projection image, and may be configured to tilt about a rotation axis 208, shown for one particular subset of the micromirrors 202, by electrostatic or other actuation. The individual micromirrors 202 have a width 212 and are arranged with gaps of width 210 therebetween. The micromirrors 202 may be formed of or coated with any highly reflective material, such as aluminum or silver, to thereby specularly reflect light. The gaps between the micromirrors 202 may be absorptive, such that input light which enters a gap is absorbed by the substrate 204.

While FIG. 2A expressly shows only some representative micromirrors 202, in practice the DMD 200 may include many more individual micromirrors in a number equal to a resolution of the projection system 100. In some examples, the resolution may be 2K (2048×1080), 4K (4096×2160), 1080p (1920×1080), consumer 4K (3840×2160), and the like. Moreover, in some examples the micromirrors 202 may be rectangular and arranged in the rectangular array; hexagonal and arranged in a hexagonal array, and the like. Moreover, while FIG. 2A illustrates the rotation axis 208 extending in an oblique direction, in some implementations the rotation axis 208 may extend vertically or horizontally.

As can be seen in FIG. 2B, each micromirror 202 may be connected to the substrate 204 by a yoke 214, which is rotatably connected to the micromirror 202. The substrate 204 includes a plurality of electrodes 216. While only two electrodes 216 per micromirror 202 are visible in the cross-sectional view of FIG. 2B, each micromirror 202 may in practice include additional electrodes. While not particularly illustrated in FIG. 2B, the DMD 200 may further include spacer layers, support layers, hinge components to control the height or orientation of the micromirror 202, and the like. The substrate 204 may include electronic circuitry associated with the DMD 200, such as CMOS transistors, memory elements, and the like.

Depending on the particular operation and control of the electrodes 216, the individual micromirrors 202 may be switched between an "on" position, an "off" position, and an unactuated or neutral position. If a micromirror 202 is in the on position, it is actuated to an angle of (for example) −12° (that is, rotated counterclockwise by 12° relative to the neutral position) to specularly reflect input light 206 into on-state light 218. If a micromirror 202 is in the off position, it is actuated to an angle of (for example)+12° (that is, rotated clockwise by 12° relative to the neutral position) to specularly reflect the input light 206 into off-state light 220. The off-state light 220 may be directed toward a light dump that absorbs the off-state light 220. In some instances, a micromirror 202 may be unactuated and lie parallel to the substrate 204. The particular angles illustrated in FIGS. 2A-2B and described here are merely exemplary and not limiting. In some implementations, the on- and off-position angles may be between ±11 and ±13 degrees (inclusive), respectively.

In the context of FIG. 1, where the DMD mirrors use an angle tilt of 12° to reflect or discard light, the second light 104 is steered to the DMD chip 105 at a fixed angle of 24°. When an individual mirror is tilted at a first predetermined angle (e.g., −12°, the mirror is considered to be in the on state and redirects light toward the first projection optics 107, the filter 109, and the second projection optics 111 (e.g., a predetermined location). When an individual mirror is tilted at a second predetermined angle (e.g., +12°), the mirror is considered to be in the off state and redirects light to a light dump located outside the active image area.

In order to ensure the image on the screen 113 has an acceptable clarity and has chromaticity and uniformity correction across the image frame, the controller 114 may be calibrated and/or configured to provide a uniformity correction to image data provided to the light source 101.

Uniformity Correction Method

Figure 3:
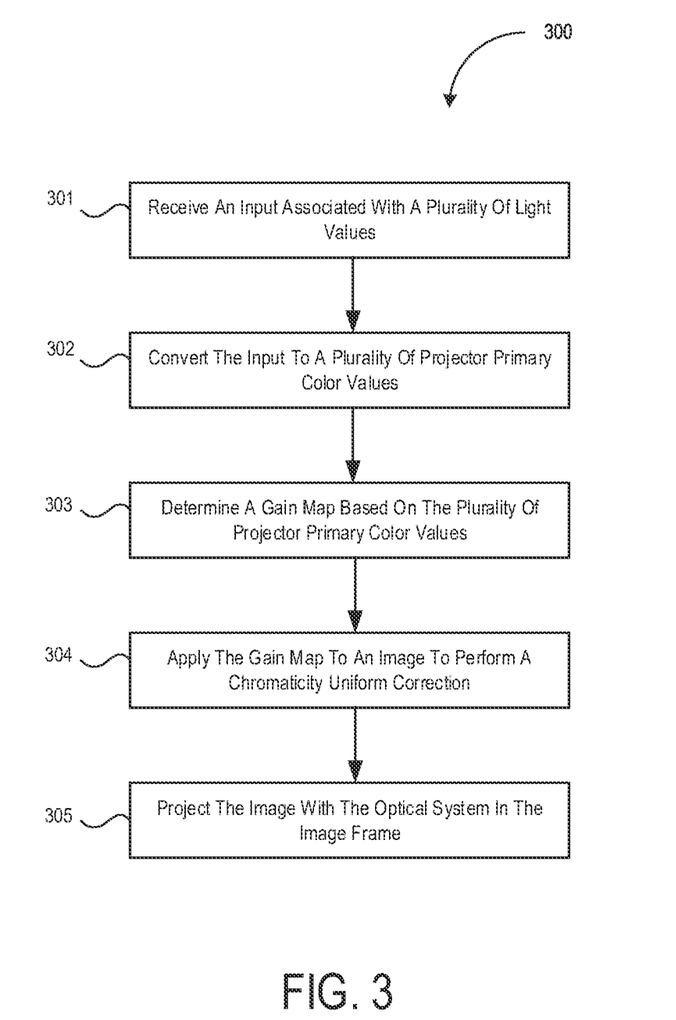
FIG. 3 illustrates an exemplary calibration method in the exemplary optical system of FIG. 1.

FIG. 3 illustrates an exemplary uniformity correction method, which may be performed during the calibration of the projection system 100 illustrated in FIG. 1. The correction method of FIG. 3 may be performed in an automated manner, for example, through a computer program as will be described in more detail below.

At operation 301, the correction method receives an input associated with a plurality of light values. The plurality of light values may correspond to, or be associated with, a plurality of primary lightfields. For example, the plurality of light values may include a value of a red lightfield at each point (e.g., each pixel) of the image frame, a value of a green lightfield at each point of the image frame, and a value of a blue lightfield at each point of the image frame.

Figure 4A:
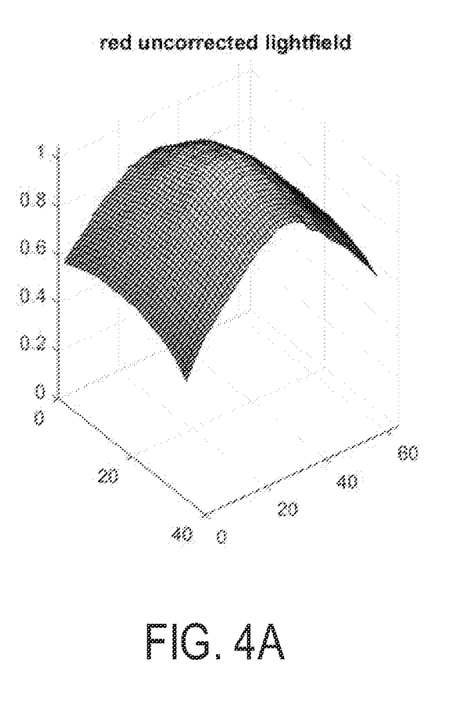
FIGS. 4A-4C illustrate views of uncorrected lightfields projected by the exemplary optical system of FIG. 1.
Figure 4B:
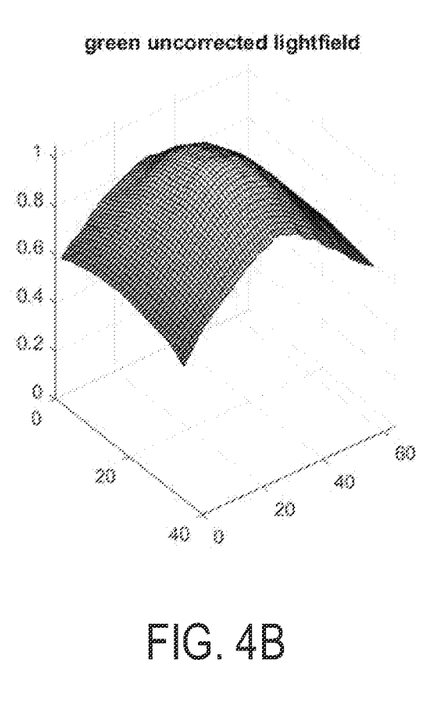
Figure 4C:
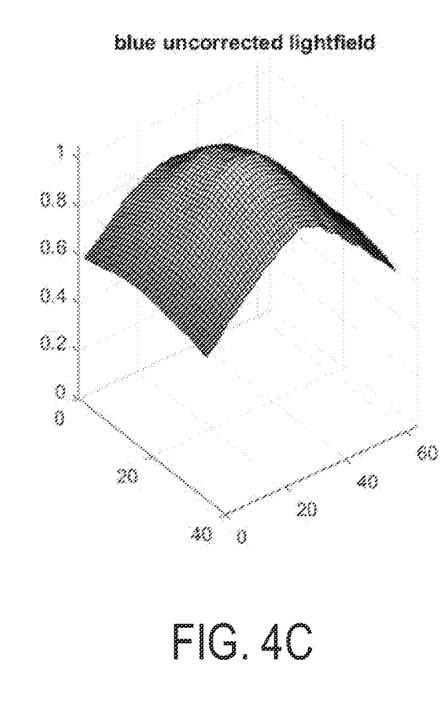

In some implementations, the input associated with the plurality of light values of the first image is a picture of a first image taken by a camera. For example, a first image is projected with the optical system in an image frame. The first image may be a white image composed of the plurality of primary lightfields, such as red, green, and blue. The first image may include chromaticity errors, such as chroma tinting along the edges of the image frame. FIGS. 4A-4C provide example lightfields of the first image. FIG. 4A provides an uncorrected red lightfield of the white image, FIG. 4B provides an uncorrected green lightfield of the white image, and FIG. 4C provides an uncorrected blue lightfield of the white image.

As can be seen in FIG. 4A, the contour of the uncorrected red lightfield at one corner, represented as (0, 40), is lower than the corresponding contour corner of the uncorrected green lightfield in FIG. 4B and the uncorrected blue lightfield in FIG. 4C. This means that the red uncorrected lightfield has a lower luminance value at (0, 40) than the green uncorrected lightfield and the blue uncorrected lightfield at (0, 40). Similarly, the contour of the uncorrected red lightfield at (40, 40) is greater than the corresponding contour of the uncorrected green lightfield and the uncorrected blue lightfield. This means that the red uncorrected lightfield has a greater luminance value at (40, 40) than the green uncorrected lightfield and the blue uncorrected lightfield at (40, 40).

The camera acts as a colorimeter that measures the R, G, and B values of the first image projected by the projection system 100, as the camera image (e.g., the input associated with the plurality of light values) provides a measured R, G, and B value at each point in the image frame. However, these values may be linearly transformed from the real values projected by the projection system 100. At operation 302, the correction method converts the input to a plurality of projector primary color values. This conversion provides the actual light values of the plurality of lightfields projected by the projector 100 and included in the first image.

At operation 303, the correction method determines a gain map based on the plurality of projector primary color values. For example, when the first image projected by the projection system 100 is a white image, the R, G, and B values are each set to a maximum. However, the maximum of each value may differ slightly due to deficiencies in manufacturing and/or calibration, or non-ideal behavior in the physical components. These may result in chroma tinting or other chromaticity and luminance errors in the first image. The projector primary color values provide the actual values the projection system 100 outputs for the first image, including the error.

Figure 5A:
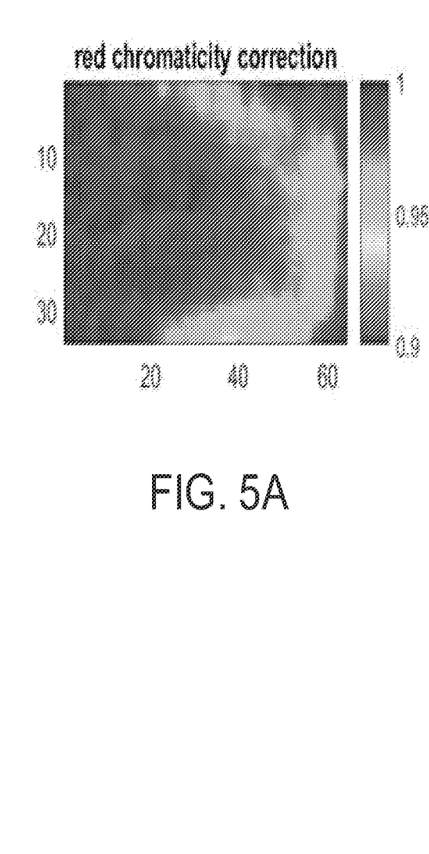
FIGS. 5A-5C illustrate views of chromaticity correction applied to the uncorrected lightfields of FIGS. 4A-4C.
Figure 5B:
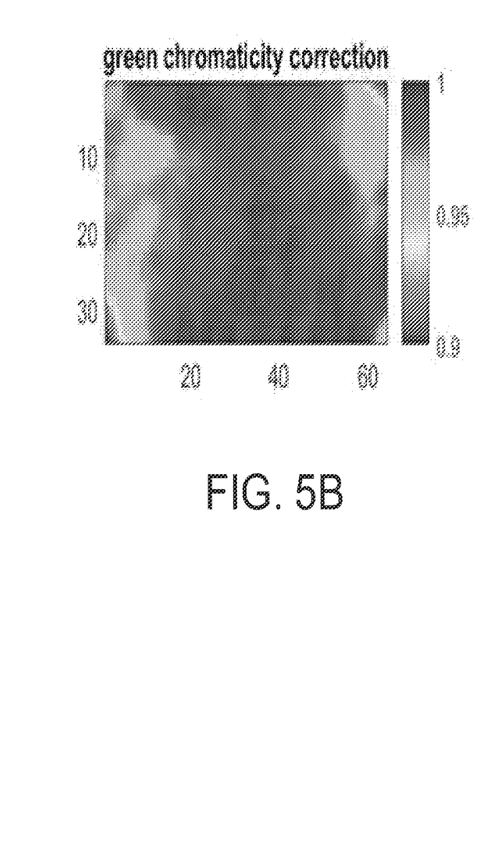
Figure 5C:
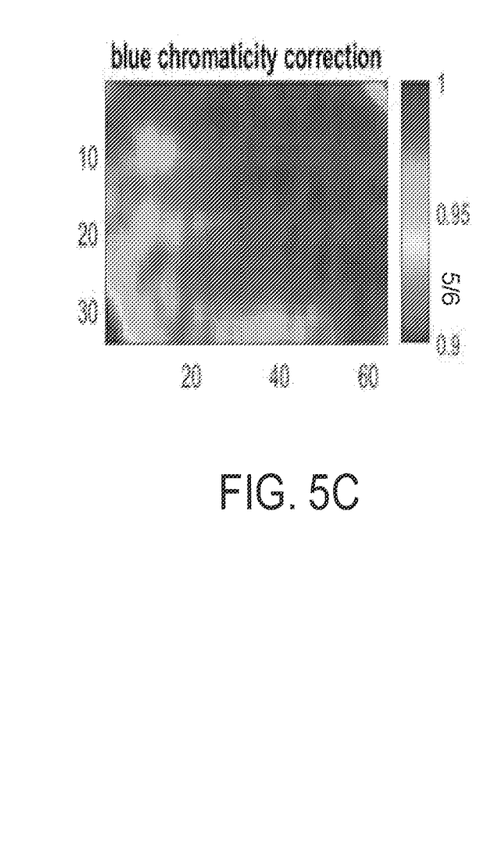

If each of the plurality of primary lightfields is at a maximum, uniformity may be achieved by lowering each R, G, and B value to a minimum of the primary lightfields. Accordingly, a level of the red primary lightfield, a level of the green primary lightfield, and a level of the blue primary lightfield are respectively adjusted so that for each point in the image frame, the respective levels are reduced to the minimum of the levels for each point. The gain map provides a map showing how much adjustment should occur at each point in the image frame to achieve uniformity. FIG. 5A, for example, provides a red chromaticity correction for the uncorrected red lightfield of FIG. 4A. FIG. 5B provides a green chromaticity correction for the uncorrected green lightfield of FIG. 4B. FIG. 5C provides a blue chromaticity correction for the uncorrected blue lightfield of FIG. 4C.

As seen in FIG. 5B, the level of the green lightfield (e.g., the light value) at (0, 40) is multiplied by 0.9 to reduce the level. This reduction brings the level of the green lightfield down to the level of the red lightfield at (0, 40). In FIG. 5C, a similar amount of reduction is applied to the blue lightfield to bring the level of the blue lightfield down to the level of the red lightfield at (0, 40). Similarly, as illustrated in FIG. 5A, the level of the red lightfield at (40, 40) is multiplied by 0.94 to reduce the level of the red lightfield to that of the green lightfield at (40, 40).

Figure 6:
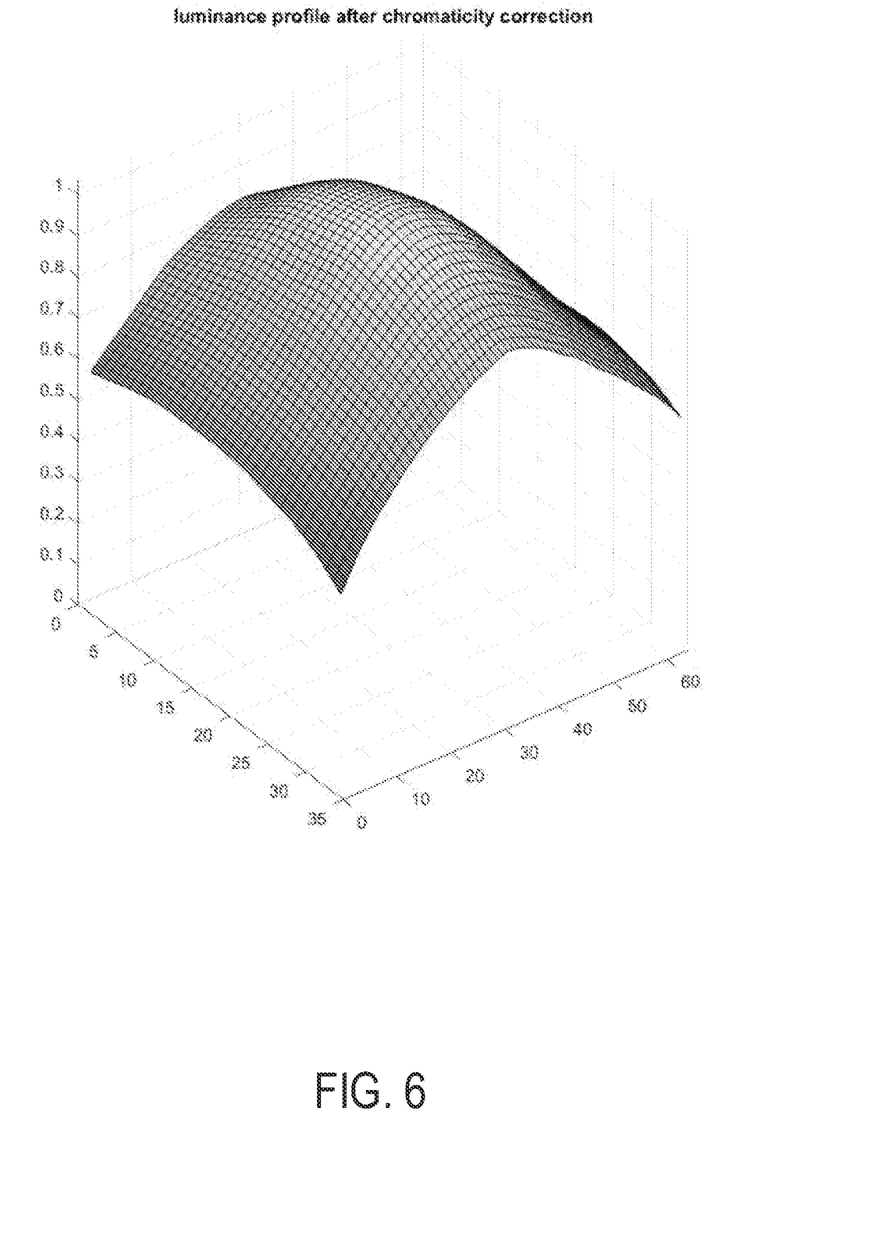
FIG. 6 illustrates a view of a luminance profile following the chromaticity correction of FIGS. 5A-5C.

At operation 304, the correction method applies the gain map to an image to perform a chromaticity uniformity correction. For example, the gain maps of FIGS. 5A, 5B, and 5C are applied to the uncorrected lightfields of FIGS. 4A, 4B, and 4C, respectively. The gain map may be applied to image data by the controller 200 prior to the image data being provided to the light source 101. For example, the controller 200 modifies the image data provided to the light source 101, and therefore modifies the image projected by the light source 101. The image may be a second image different than the first image. At operation 305, the correction method projects the image with the optical system in the image frame. For example, the image defined by the corrected image data is displayed to a viewer. The second image may have a corrected lightfield, such as that illustrated by FIG. 6. The second image may be visually uniform across the image frame. Additionally, the second image may have a luminance profile that is a smooth maximum lower-bound of the plurality of primary lightfields due to applying the gain map and adjusting the levels of the plurality of primary lightfields. By using a smooth maximum lower-bound, a smooth luminance profile is achieved.

As one particular example of the operations of FIG. 3, the following pseudocode is presented using a MATLAB-like format:

```
%Show the unmodified white input image
imgIn = 1;
imgShow = imgIn;
%Take a picture of the displayed image and convert to display primary levels
imgCapture = TakeAndConvertPicture( );
%For each pixel, find the min of R, G, and B.
imgTarget = MinRGB(imgCapture);
%Smooth any unwanted variations in the target luminance.
imgTarget = Smooth(imgTarget);
%Find the gain maps for R, G, and B images.
imgGain = imgTarget ./ imgCapture; %Pointwise division for each color.
imgGain = imgGain / max(imgGain); %All gains must be reductions.
%Show the corrected white input image.
imgIn = 1;
imgShow = imgIn .* imgGain;
```

In the above pseudocode, imgIn is the input image expressed in display primary levels, and may show uniformity errors; imgGain is a gain image used to apply the uniformity correction; imgShow is the image used to drive the display device; imgCapture is the displayed image captured by a camera and converted to display primary levels; imgTarget is the level image that the R, G, and B images will conform to after correction; TakeAndConvertPicture( ) is a function that takes a picture of the display image and converts it to display primary levels; minRGB( ) is a function that takes an RGB image and returns a monochrome image with each pixel the minimum of R, G, and B at that pixel; and Smooth( ) is a function that smooths an image enough to remove unwanted higher spatial variations in luminance.

The operations described herein may be implemented as instructions or code stored on non-transitory computer-readable medium, such as a hard disk or other storage medium contained in or associated with the projection system 100 (e.g., a memory of the controller 114).

The above projection systems and methods may provide for correcting uniformity errors in an image frame. Systems, methods, and devices in accordance with the present disclosure may take any one or more of the following configurations.

(1) A projection system, comprising: a light source configured to emit a light in response to an image data; an optical system configured to project the light emitted by the light source; and a controller configured to: receive an input associated with a plurality of light values corresponding to a plurality of primary lightfields, convert the input associated with the plurality of light values to a plurality of projector primary color values, determine a gain map based on the plurality of projector primary color values, apply the gain map to an image to perform a chromaticity uniformity correction by adjusting levels of the plurality of primary lightfields so that a primary mixture is the same over an image frame, and project the image with the optical system in the image frame, wherein the second image is corrected by the gain map.

(2) The projection system according to (1), wherein the optical system includes: an illumination optics configured to steer the light emitted by the light source into a steered light; a digital micromirror device configured to receive the steered light from the illumination optics and convert the steered light into a modulated light; and a projection optics configured to project the modulated light onto a screen.

(3) The projection system according to any one of (1) to (2), wherein the controller is further configured to project a first image with the optical system in an image frame, the first image comprising the plurality of primary lightfields.

(4) The projection system according to any one of (1) to (3), wherein the input associated with the plurality of light values of the first image is a picture of the first image taken by a camera.

(5) The projection system according to any one of (1) to (4), wherein applying the gain map to the image includes modifying an image signal provided by the light source.

(6) The projection system according to any one of (1) to (5), wherein the plurality of primary lightfields includes red, green, and blue primary lightfields.

(7) The projection system according to (6), wherein a level of the red primary lightfield, the green primary lightfield, and the blue primary lightfield are respectively adjusted so that for a plurality of individual points on the image frame, the respective levels are reduced to the minimum of the levels for the plurality of individual points.

(8) The projection system according to any one of (1) to (7), wherein the first image includes chroma tinting on at least one location on at least one edge of the image frame.

(9) The projection system according to any one of (1) to (8), wherein the second image is visually uniform across the image frame.

(10) The projection system according to any one of (1) to (9), wherein a smooth maximum lower-bound of the plurality of primary lightfields is a luminance profile of the second image.

(11) A method of correcting an image provided by a light source configured to emit a light in response to image data and an optical system configured to project the light emitted by the light source, the method comprising: receiving an input associated with a plurality of light values corresponding to a plurality of primary lightfields, converting the input associated with the plurality of light values to a plurality of projector primary color values, determining a gain map based on the plurality of projector primary color values, applying the gain map to an image to perform a chromaticity uniformity correction by adjusting levels of the plurality of primary lightfields so that a primary mixture is the same over an image frame, and projecting the image with the optical system in the image frame, wherein the second image is corrected by the gain map.

(12) The method according to (11), wherein the optical system includes: and illumination optics configured to steer the light emitted by the light source into a steered light; a digital micromirror device configured to receive the steered light from the illumination optics and convert the steered light into a modulated light; and a projection optics configured to project the modulated light onto a screen.

(13) The method according to (11) or (12), further comprising projecting a first image with the optical system in an image frame, the first image comprising a plurality of primary lightfields.

(14) The method according to any one of (11) to (13), wherein the input associated with the plurality of light values of the first image is a picture of the first image taken by a camera.

(15) The method according to any one of (11) to (14), wherein applying the gain map to the image includes modifying an image signal provided by the light source.

(16) The method according to any one of (11) to (15), wherein the plurality of primary lightfields includes red, green, and blue primary lightfields.

(17) The method according to (16), wherein a level of the red primary lightfield, the green primary lightfield, and the blue primary lightfield are respectively adjusted so that for a plurality of individual points on the image frame, the respective levels are reduced to the minimum of the levels for the plurality of individual points.

(18) The method according to any one of (11) to (17), wherein the second image is visually uniform across the image frame.

(19) The method according to any one of (11) to (18), wherein a smooth maximum lower-bound of the plurality of primary lightfields is a luminance profile of the second image.

(20) A non-transitory computer-readable medium storing instructions that, when executed by a processor of a projection system, cause the projection system to perform operations comprising the method according to any one of (11) to (19).

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments incorporate more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A projection system, comprising:
   a light source configured to emit a light in response to image data;
   an optical system configured to project the light emitted by the light source; and
   a controller configured to:
      receive an input associated with a plurality of light values corresponding to a plurality of primary lightfields for a first image;
      convert the input associated with the plurality of light values to a plurality of projector primary color values;
      determine a gain map based on the plurality of projector primary color values;
      apply the gain map to the first image to perform a chromaticity uniformity correction by adjusting levels of the plurality of primary lightfields so that a primary mixture is the same over an image frame, thereby generating a second image; and
      project the second image with the optical system, wherein the second image is corrected by the gain map.

2. The projection system according to claim 1, wherein the optical system includes:
   an illumination optics configured to steer the light emitted by the light source into a steered light;
   a digital micromirror device configured to receive the steered light from the illumination optics and convert the steered light into a modulated light; and
   a projection optics configured to project the modulated light onto a screen.

3. The projection system according to claim 1, wherein the controller is further configured to:
   project the first image with the optical system, the first image comprising the plurality of primary lightfields.

4. The projection system according to claim 1, wherein the input associated with the plurality of light values of the first image is a picture of the first image taken by a camera.

5. The projection system according to claim 1, wherein applying the gain map to the first image includes modifying an image signal provided by the light source.

6. The projection system according to claim 1, wherein the plurality of primary lightfields includes red, green, and blue primary lightfields.

7. The projection system according to claim 6, wherein a level of the red primary lightfield, a level of the green primary lightfield, and a level of the blue primary lightfield are respectively adjusted so that for each point of a plurality of individual points on the image frame, two of the respective levels are reduced to a minimum of the levels of the red primary lightfield, the green primary lightfield, and the blue primary lightfield.

8. The projection system according to claim 1, wherein the first image includes chroma tinting on at least one location on at least one edge of the image frame.

9. The projection system according to claim 1, wherein the second image is visually uniform across the image frame.

10. The projection system according to claim 1, wherein applying the gain map results in a luminance profile of the second image matching a smooth maximum lower-bound estimation of the plurality of primary lightfields.

11. A method of correcting a projected image including a light source configured to emit a light in response to image data and an optical system configured to project the light emitted by the light source, the method comprising:
   receiving an input associated with a plurality of light values corresponding to a plurality of primary lightfields of a first image,
   converting the input associated with the plurality of light values to a plurality of projector primary color values,
   determining a gain map based on the plurality of projector primary color values, applying the gain map to the first image to perform a chromaticity uniformity correction by adjusting levels of the plurality of primary lightfields so that a primary mixture is the same over an image frame, thereby generating a second image, and projecting the second image with the optical system, wherein the second image is corrected by the gain map.

12. The method according to claim 11, wherein the optical system includes:

an illumination optics configured to steer the light emitted by the light source into a steered light;

a digital micromirror device configured to receive the steered light from the illumination optics and convert the steered light into a modulated light; and a projection optics configured to project the modulated light onto a screen.

13. The method according to claim 11, further comprising:

projecting the first image with the optical system, the first image comprising the plurality of primary lightfields.

14. The method according to claim 11, wherein the input associated with the plurality of light values of the first image is a picture of the first image taken by a camera.

15. The method according to claim 11, wherein applying the gain map to the first image includes modifying an image signal provided by the light source.

16. The method according to claim 11, wherein the plurality of primary lightfields includes red, green, and blue primary lightfields.

17. The method according to claim 16, wherein a level of the red primary lightfield, a level of the green primary lightfield, and a level of the blue primary lightfield are respectively adjusted so that for each point of a plurality of individual points on the image frame, two of the respective levels are reduced to a minimum of the levels of the red primary lightfield, the green primary lightfield, and the blue primary lightfield.

18. The method according to claim 11, wherein the second image is visually uniform across the image frame.

19. The method according to claim 11, wherein applying the gain map results in a luminance profile of the second image matching a smooth maximum lower-bound estimation of the plurality of primary lightfields.

20. A non-transitory computer-readable medium storing instructions that, when executed by a processor of a projection system, cause the projection system to perform operations comprising the method according to claim 11.

* * * * *

UNITED STATES PATENT AND TRADEMARK OFFICE
CERTIFICATE OF CORRECTION

| | |
|---|---|
| PATENT NO. | : 12,081,917 B2 |
| APPLICATION NO. | : 17/796423 |
| DATED | : September 3, 2024 |
| INVENTOR(S) | : Jerome D. Shields |

It is certified that error appears in the above-identified patent and that said Letters Patent is hereby corrected as shown below:

On the Title Page

Column 2, Item (57) ABSTRACT:
Line 9, After "plurality", delete "Values"

Signed and Sealed this
Nineteenth Day of November, 2024

Katherine Kelly Vidal
*Director of the United States Patent and Trademark Office*